US010152735B2

(12) United States Patent
Mukherjee et al.

(10) Patent No.: US 10,152,735 B2
(45) Date of Patent: Dec. 11, 2018

(54) METHODS AND SYSTEMS FOR AUTOMATICALLY CREATING AND SUGGESTING COMPATIBLE RIDE-SHARING GROUPS

(71) Applicant: Conduent Business Services, LLC, Dallas, TX (US)

(72) Inventors: Koyel Mukherjee, Bangalore (IN); Theja Tulabandhula, Bangalore (IN); Asmita Metrewar, Nanded (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 185 days.

(21) Appl. No.: 15/225,074

(22) Filed: Aug. 1, 2016

(65) Prior Publication Data

US 2018/0033058 A1 Feb. 1, 2018

(51) Int. Cl.
*G01C 21/34* (2006.01)
*G06Q 30/02* (2012.01)
*H04L 29/08* (2006.01)
*G06Q 50/00* (2012.01)

(52) U.S. Cl.
CPC ..... *G06Q 30/0282* (2013.01); *G01C 21/3438* (2013.01); *G06Q 50/01* (2013.01); *H04L 67/306* (2013.01)

(58) Field of Classification Search
CPC ............ G01C 21/3676; G01C 21/3438; G06Q 10/047; G06Q 50/01; H04B 1/3833; H04L 67/12; H04L 67/18; H04L 67/42; H04L 67/306

USPC ......................................................... 701/410
See application file for complete search history.

(56) References Cited

U.S. PATENT DOCUMENTS

| | | | |
|---|---|---|---|
| 8,688,378 B2 | 4/2014 | McCall et al. | |
| 2013/0159028 A1 | 6/2013 | Lerenc et al. | |
| 2014/0180764 A1 | 6/2014 | Lehmann | |
| 2015/0204684 A1* | 7/2015 | Rostamian | G01C 21/3438 701/537 |

OTHER PUBLICATIONS

Haris Aziz, Serge Gaspers, Joachim Gudmundsson, Julian Mestre, and Hanjo Taubig. Welfare maximization in fractional hedonic games. IJCAI, 2015.

(Continued)

*Primary Examiner* — Maceeh Anwari
(74) *Attorney, Agent, or Firm* — Jones Robb, PLLC

(57) ABSTRACT

Embodiments disclose methods and systems for forming one or more ride-sharing groups of a ride-sharing system before executing a ride. The system receives a request for a ride from each user, each request includes details related to the ride and the user. Then, a compatibility score for each pair of users is computed. Based on the computed score, a ride-sharing group is created including one or more members estimated to be compatible with each other. The ride-sharing group is displayed to each member of the ride-sharing group along with pre-defined details of each member. Then a feedback about the ride-sharing group from each group member is received, the feedback being in the form of an acceptance or a rejection. Based on the feedback, the ride-sharing group is updated to include one or more new members or allocate one or more resources to the ride-sharing group.

22 Claims, 6 Drawing Sheets

(56) References Cited

OTHER PUBLICATIONS

Tomas Feder, Pavol Hell, Sulamita Klein, and Rajeev Motwani. Complexity of graph partition problems. In Proceedings of the thirty-first annual ACM symposium on Theory of computing, pp. 464{472. ACM, 1999.

Filippo Bistffa, Alessandro Farinelli, and Sarvapali D Ramchurn. Sharing rides with friends: a coalition formation algorithm for ridesharing. AAAI, 2015.

Filippo Bista_a, Alessandro Farinelli, Georgios Chalkiadakis, and Sarvapali Ramchurn. Recommending fair payments for large-scale social ridesharing. Unpublished manuscript, 2015.

* cited by examiner

METHODS AND SYSTEMS FOR AUTOMATICALLY CREATING AND SUGGESTING COMPATIBLE RIDE-SHARING GROUPS

TECHNICAL FIELD

The present disclosure relates generally to the field of ride-sharing. More particularly, the present disclosure relates to methods and systems for automatically creating and suggesting compatible ride-sharing groups to users in real-time.

BACKGROUND

Ride-sharing systems have been an economical mode of travel since the recent past and thus, have gained a lot of popularity. A few popular ride-sharing service providers include, for example, Uber, Lyft, Ola, BlaBlaCar, etc., and these have launched products and services in the given space. One of the key challenges of the ride-sharing systems is to make a ride-sharing experience as pleasant or happy for all users. Based on a recent study, it is determined that interpersonal compatibilities and reservations about co-riders often act as the main deterrents for the users of ride-sharing systems. For instance, a person who doesn't like making conversation may not prefer to be placed in the same group including people who are extroverts and talk a lot. In a similar manner, a person who likes to offer ride shares in her car may not like if a passenger comments on his or her riding. Therefore, it is extremely important to address the compatibility issues among users sharing rides in order to ensure a pleasant ride-sharing experience.

A number of solutions exist in the market but most of the solutions mainly focus on suggesting co-riders based on basic parameters such as source, destination, and departure/arrival time. While some ride-sharing systems permit a rider to choose co-riders based on affiliations of the rider or one of the prior ride experiences. One of the disadvantage of such systems is that an active participation of the rider is required in formation of the groups, which sometimes increases burden on the rider. Further, the affiliations of the rider may not reside at similar locations, nor commute to proximate destinations. Such affiliations of the rider are usually a smaller subset in comparison to a total number of route compatible users available on a typical ride-sharing system. In other words, none of the solutions focus on forming groups considering the pleasantness of the ride-sharing experience. Therefore, there is a need for methods and systems for forming ride-sharing groups in order to have a pleasant ride-sharing experience.

SUMMARY

The present disclosure discloses a system for forming one or more ride-sharing groups for one or more users of a ride-sharing system before executing a ride, the system being in communication with one or more user devices. The system includes a processor; and a memory communicatively coupled to the processor, wherein the memory is configured to store program code which when executed by the processor causes the system to: receive a request for a ride from each user, each request includes details related to the ride and details related to the user. Based on the received details, a compatibility score for each pair of users is computed. Based on the computed score, automatically a ride-sharing group is created including one or more members estimated to be compatible with each other. Then, the ride-sharing group is sent for display to each member of the ride-sharing group along with pre-defined details of each member, the ride sharing group is displayed to the user via the respective user device. A feedback about the ride-sharing group from each group member is received via the respective user device, the feedback being in the form of an acceptance or a rejection. Based on the feedback, the ride-sharing group is updated to include one or more new members or one or more resources to the ride-sharing group are allocated. The step of updating the ride-sharing group is repeated until each group member indicates the feedback in the form of an acceptance, wherein the one or more ride-sharing groups are formed based on interaction between the ride-sharing system and the one or more user devices in real-time, such that members are compatible within each group.

The disclosure further describes a ride-sharing system for automatically forming and suggesting ride-sharing groups, the ride-sharing system being in communication with one or more user devices. The system includes a processor programmed to receive a request for a ride from each user, each request includes details related to the ride and details related to the user. A ride-sharing group is automatically created, including one or more members estimated to be compatible with each other based on a compatibility score of each user. The ride-sharing group is displayed to each group member of the ride-sharing group along with pre-defined details of each group member. A feedback about the ride-sharing group from each group member is received before executing the ride, the feedback being in the form of an acceptance or a rejection. Based on the feedback, the ride-sharing group is updated to include one or more new members or one or more resources to the ride-sharing group are allocated. The step of updating the ride-sharing group is repeated until each group member indicates the feedback in the form of acceptance and after the ride is completed, an overall feedback about the ride-sharing experience from each group member is received.

The disclosure further discloses a method for forming and suggesting one or more compatible ride-sharing groups for one or more users of a ride-sharing system in a real-time. The method includes receiving a request from each user, each request includes details related to a ride and details related to the user. Based on the received details, a ride-sharing group is automatically created, including one or more users estimated to be compatible with each other, based on a compatibility score of each user, the one or more users forming a part of the ride-sharing group are group members. The ride-sharing group is displayed to each group member of the ride-sharing group along with details of each group member. A feedback about the ride-sharing group from each group member is received, the feedback being in the form of an acceptance or a rejection. Based on the feedback, the ride-sharing group is updated to include one or more new members or one or more resources to the ride-sharing group are allocated. The above is repeated until the each group member indicates the feedback in the form of the acceptance.

The disclosure additionally discloses a method for automatically creating one or more compatible groups for a set of users of a ride-sharing system in a real-time, the set of users are route compatible users. The method includes receiving information about each user of the set of users. A compatibility score for each user of the set of users is computed, using a predefined algorithm. Based on the computed score, one or more ride-sharing groups are created automatically, each group including one or more compatible members, wherein the one or more compatible members belong to the set of the users. For each group, the ride-sharing group to each group member of the ride-sharing group is displayed. For each group, a feedback about the ride-sharing group from each member of the group is received, the feedback is in the form of acceptance or rejection. Based on the feedback, performing one of the following: for each group, if the feedback from at least one member is in the form of rejection, the ride-sharing group is updated to include one or more new members and the above is repeated until each group member indicates the feedback in the form of an acceptance. For each group, if the feedback from each member is in the form of an acceptance, one or more resources to the ride-sharing group are allocated.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
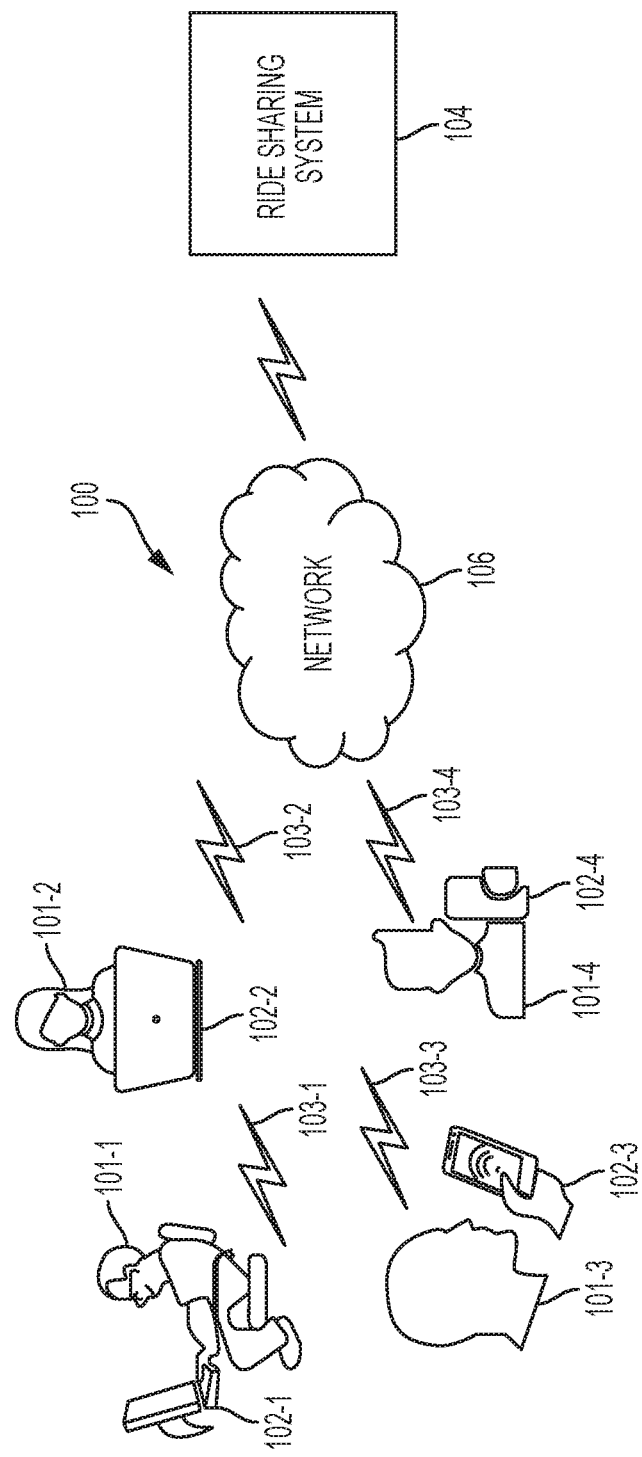
FIG. 1 depicts an exemplary embodiment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "ride-sharing" is defined to include services where a vehicle (may be personal/private, or public, cab, etc.) is shared by one or more users while travelling along a route. Ride-sharing service may be in the form of on demand ride-sharing, dynamic ride-sharing, ad-hoc ride-sharing and so on. A number of companies are providing such services and are referred to as ride-sharing service providers. The term "users" refer to all types of users (e.g., students, professionals, business-man, etc.) who use ride-sharing service for travelling from one point to another point. Some of the users share a ride along a route A, whereas some other users share a ride along a route B. The users who share or are estimated to share a ride along a route are referred to as "group members" or are a considered to be a part of a ride-sharing group. In simple words, a "group member" is the one who shares a ride or is estimated to share a ride along a part of a route. The "group members" belong to the "users" of the ride-sharing service as discussed above. The term "details" is defined to include any information related to a ride or to a user. The ride details include details on source, destination or related route information, etc. The user details include name of the user, professional details, the address details, social networking details, profile information, preferences, feedback (if available), rating (if available), comment (if available) or any other details that are relevant and help identifying the user. The profile information may be defined to include a social profile, a professional profile of the user or a profile available on the ride-sharing system.

The term "compatible ride-sharing group" refers to a group including one or more members, where each member is estimated to be compatible with each other. The term "compatibility" is defined in terms of happiness of members, pleasant ride-sharing experience or preferences of the members while sharing a ride. The term compatibility may interchangbly be used with the phrase happiness. In all, the terms compatibility or happiness are defined to indicate a comfort of a user travelling with other users while sharing a ride. For example, a user who doesn't like making conversation may not prefer to be placed in the same group that includes members who are extroverts and talk a lot. A "compatible score" refers to a value indicating compatibility of a user relative to other users of a ride-sharing group. The term "ride-sharing system" is a system that facilitates ride-sharing services to the users.

Overview

The present disclosure addresses the pleasantness or happiness issue as well reduces the decision making and cognitive burden on users of ride-sharing service. This is done by intelligently and automatically deciding which groups of ride-sharing users can travel together. The groups are formed such that happiness index among all groups is as high as possible. Disclosed embodiments provide methods and systems for automatically creating and suggesting one or more ride-sharing groups for a given set of users of a ride-sharing service/system. Specifically, the disclosure focuses on creating one or more compatible ride-sharing groups such that compatibility of users within each group is as high as possible. To this end, the disclosure incorporates an explore-exploit strategy to improve a compatibility score over time. The disclosure also includes a cognitive learning feedback strategy for determining pairwise preferences amongst the set of users.

Exemplary Environment

FIG. 1 illustrates an exemplary environment 100 in which various embodiments of the disclosure can be practiced. The environment 100 includes a plurality of computing devices 102-1, 102-2, 102-3 and 102-4 (collectively referred to as 102), and a ride-sharing system 104. Each computing device 102 is communicatively coupled to a network 106 via respective communication links shown as 103-1, 103-2, 103-3, and 103-4. The network 106 further communicatively couples the computing devices 102 to the ride-sharing system 104. In this manner, each computing device 102 is coupled to the ride-sharing system 104.

As shown, the computing devices 102 refer to any electronic device which is capable of sending or receiving information, processing information as and when received. Various examples of the computing devices 102 include a smart phone, a mobile device, a Personal Digital Assistant (PDA), a computer, a workstation, a notebook, a mainframe computer, a laptop, a tablet, an internet appliance, or any equivalent device capable of processing data, sending/receiving data or the like. As shown, users 101-1, 101-2, 101-3, and 101-4 (collectively 101) use respective computing devices 102-1, 102-2, 102-3, 102-4 for their day-to-day tasks such as emails, internet surfing, games, social networking, or the like.

In the context of the current disclosure, the users 101 use the computing devices 102 for using ride-sharing services, as hosted by the ride-sharing system 104. The ride-sharing service may be hosted in the form of a website or a mobile app. For the computing devices like laptops 102-2, or computers 102-1, the ride-sharing service may be in the form a website. While for the computing devices such as smart phones 102-3, and 102-4, the ride-sharing service may be in the form of a mobile app.

As shown, the ride-sharing system 104 can be any device which is capable of sending or receiving information, and processing information received from the users. Other functionalities include storage, computing, communicating, searching and the like. In the context of the current disclosure, the ride-sharing system 104 facilitates or provides ride-sharing service to the users 101. Specifically, the ride-sharing system 104 automatically creates and suggests one or more compatible ride-sharing groups. The groups are formed such that happiness index/compatibility score is maintained within each group. In an embodiment, a route compatibility between users of each group can be assumed in the aforesaid computation of group formation. The ride-sharing system 104 process a given set of users into groups so that every group and member is better o□ compared to any other alternative. The given set of users are partitioned into groups of a given size such that the worst happiness or any other function of happiness in general of any pair of users among all groups that are formed, is maximized. The ride-sharing system 104 learn pairwise preferences of users through pure exploration as well as explore exploit strategies. More functional and structural details will be discussed in conjunction with the below figures.

The ride-sharing system 104 allows the users 101 to provide input in terms of source, destination, profile information, preferences, feedback, rating, comment or any other information and further computes or re-computes compatible score for each user and group those users accordingly based on the score.

In some embodiments, the ride-sharing system 104 may be implemented for service providers who offer transport services to the users like Ola, Lyft, Uber, etc. In other embodiments, the ride-sharing system 104 may also be implemented for individual users who offer rides in their vehicles, etc.

The ride-sharing system 104 may be integrated into existing platforms of the ride-sharing service providers. In some cases, the ride-sharing service providers may communicate with the ride-sharing system 104 for forming compatible ride-sharing groups as and when required. In such cases, the service providers share initial route and other details received from the users 101 and the ride-sharing system 104 creates and forms compatible ride-sharing groups and share with the service providers.

As indicated, the network 106 may be any suitable wired, wireless network, a combination of these or any other conventional network, without limiting the scope of the disclosure. Few examples may include a LAN or wireless LAN connection, an Internet connection, a point-to-point connection, or other network connection and combinations thereof. The network 106 can be any other type of network that is capable of transmitting or receiving data to/from host computers, personal devices, telephones or any other electronic devices. Further, the network 106 is capable of transmitting/sending data between the mentioned devices. Additionally, the network 106 may be a local, regional, or global communication network, for example, an enterprise telecommunication network, the Internet, a global mobile communication network, or any combination of similar networks. The network 106 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 106 may include any software, hardware, or computer applications that can provide a medium to exchange signals or data in any of the formats known in the art, related art, or developed later.

Exemplary System

Figure 2:
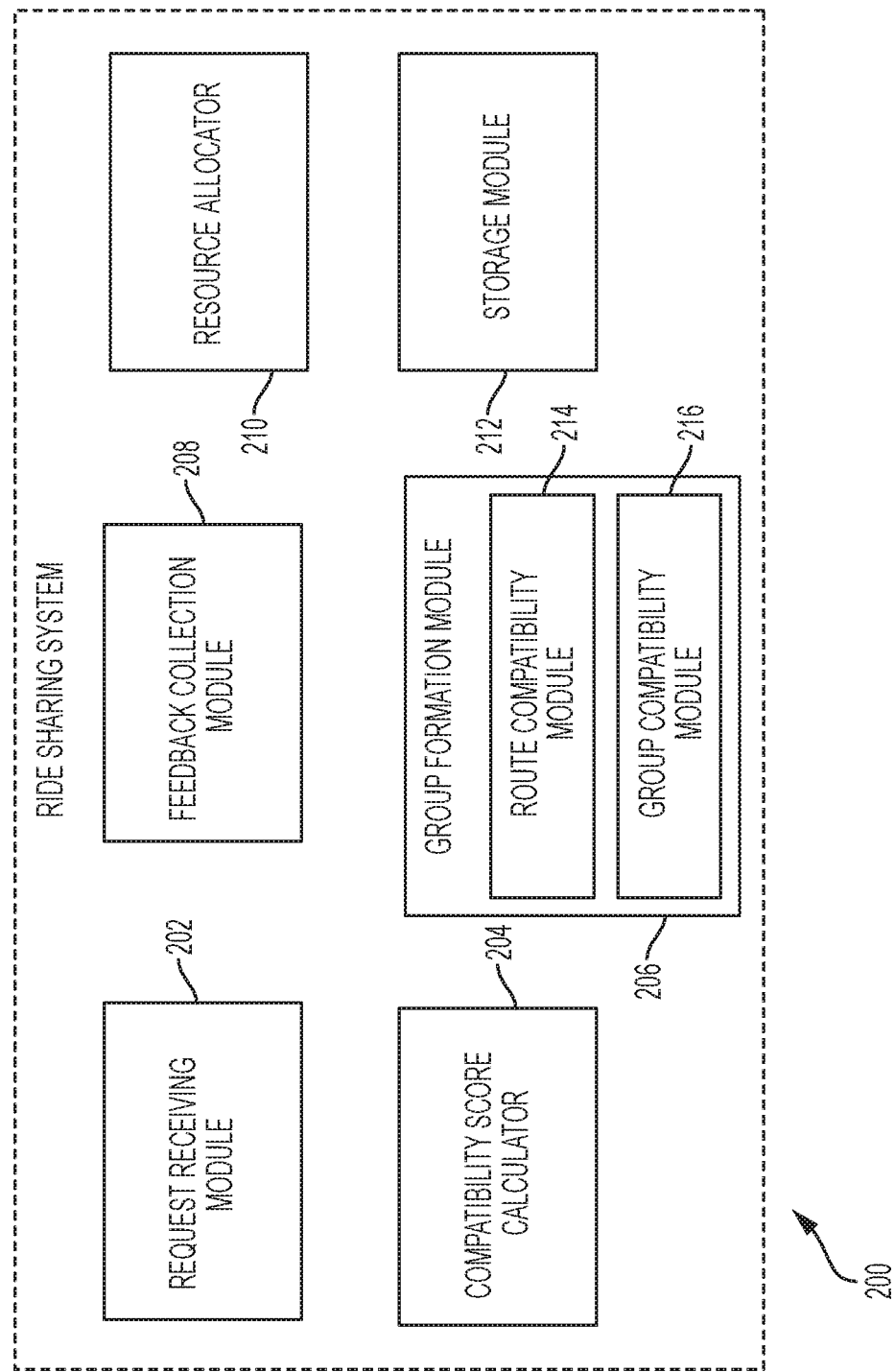
FIG. 2 is a simplified block diagram of a ride-sharing system, according to an embodiment.

FIG. 2 illustrates an exemplary ride-sharing system 200 according to an embodiment of the disclosure. The primary aim of the ride-sharing system 200 is to form one or more ride-sharing groups such that pleasantness factor for all members within each group is maximized. In particular, the ride-sharing system 200 processes a list of given set of users into the one or more ride-sharing groups such that each member is compatible within the group.

The ride-sharing system 200 may be implemented in the form of hardware, software, or a combination of these. In some embodiments, the ride-sharing system 200 may be implemented in the form of a website hosted by a service provider, while in other embodiments, the ride-sharing system 200 may be in the form of an app.

In some embodiments, the ride-sharing system 200 is typically hosted or implemented by transport service providers for managing ride-sharing services. This mode is a ride-seeker mode where all users are of same type i.e., ride-seekers. Here, the service providers may have multiple vehicles for managing the services and allocate their resources (drivers and vehicles) to all users or groups to minimize their cost of operations. This can be done by job scheduling optimization formulation if required. An integer programming formulation and heuristic algorithms may be implemented that trades o□ solution quality to computational budget.

While in other embodiments, the ride-sharing system 200 may be implemented by individuals or a group of users who offer ride-sharing services. This mode is a ride-initiator mode, where one user from each group initiates a ride and the remaining users from each group seek ride-share. In this mode, a user from each group uses use his or her personal vehicle for such services. The ride-sharing system 200 takes this information into account such that no single group has more than one ride-initiator or ride-giver. For such scenarios, an iterative algorithm may be implemented that ensures that the aforementioned properties are satisfied while forming groups.

As shown, the ride-sharing system 200 a request receiving module 202, compatibility score calculator 204, a group formation module 206, a feedback collection module 208, a resource allocator 210, and a storage module 212 (or memory). Each of these modules/components is connected to each other via suitable communication protocols, a conventional bus or a later developed bus. Further, each of the components is configured to perform one or more functions related to ride-sharing that will be discussed below in greater detail.

The ride-sharing system 200 usually operates in batch mode. Alternatively, the ride sharing system 200 may also operate in an instantaneous or real-time mode with minor modifications. For instance, in the real-time mode, a similar sequence steps as in the batch mode, may be followed, as soon as a new user arrives instead of in batches. Initially, when a user logs into the ride-sharing system 200 and is actively seeking ride-shares, she is added to the current pool of users that are all active and route compatible with each other. That is, the currently active users are partitioned into clusters accounting for their geographical and timing compatibilities. Such lists are generated for all route compatible clusters of participants simultaneously. The ride-sharing system 200 collects all the active users till the end of a predetermined interval (say 5 minutes), creates lists and then passes these lists to modules for further processing. In some embodiments, this may also be performed by the request receiving module 202.

The request receiving module 202 receives one or more requests from one or more users of the ride-sharing system 200. Each request includes respective ride details and respective details of the user. The ride details may include source information, destination information (collectively as geographical information), departure time, and arrival time (collectively as timing information). The user details includes profile information, characteristics, preferences, or any such details. The user details may be taken or extracted from their social networking profile, professional profile or the like. After receiving, the details are passed onto the compatibility score calculator 204. The compatibility score calculator 204 calculates score for each user using one or more algorithms as discussed below. The calculated scores are then passed onto the group formation module 206. The scores indicate the level of comfort/compatibility of a user to travel with other users of the ride-sharing system 200. In other words, the scores indicate preferences of a user while using ride-sharing services. For example, a user may not like making conversation. In another example, a female user may not like travelling with male users or vice versa. The compatibility score for each user is usually set to an initial value by the ride-sharing system 200. The initial value is based on stored details of each user as stored in the storage module 212.

The group formation module 206 includes a route compatibility module 214 and a group compatibility module 216. The route compatibility module 214 first forms groups of users who are route compatible, i.e., who are likely to be travelled on the same route. These groups are formed based on the geographical information and timing information. For example, the group formation module 206 clubs three users who wish to travel from Street 1, Chicago to Street 2, Chicago. A technique of grouping users that are route compatible into a list of members, is known in art. In some embodiments, the group formation of users who are route compatible may be performed by other third party solutions as known in the art. Accordingly, the group compatibility module 216 may receive the group of users from the third party systems to further define groups based on compatibility scores of the users as calculated above and this has been discussed in detail below.

Once the grouping based on geographical and timing information is done, the group compatibility module 216 further defines one or more ride-sharing groups based on compatibility scores as calculated above by the compatibility score calculator 204. Each ride-sharing group includes one or more members who are estimated to be compatible with each other.

Once formed, the ride-sharing groups are suggested and displayed to members of each group for their feedback. While displaying, the group formation module 206 displays some details of co-group members to each member (see FIGS. 5 and 6). The feedback is in the form of acceptance of the ride-sharing group or rejection of the ride-sharing group. The feedback is received from each group member by the feedback collection module 208. Based on the feedback, the feedback module 208 moves forward. For example, if the feedback from each group member is in the form of "acceptance," the feedback collection module 208 considers the ride-sharing group as a compatible ride-sharing group. But if the feedback from any of the group member is in the form of "rejection," the feedback collection module 208 communicates with the compatibility score calculator 204 to re-compute the compatibility score for each member in order to define a new group. This re-computation is done based on this information and other historical information. The new group includes one or more new members in addition to old members who have provided the feedback in the form of acceptance. Again, the feedback collection module 208 recommends the new group for their feedback and this process is repeated till each member of the group provides the feedback in the form of acceptance.

Figure 4:
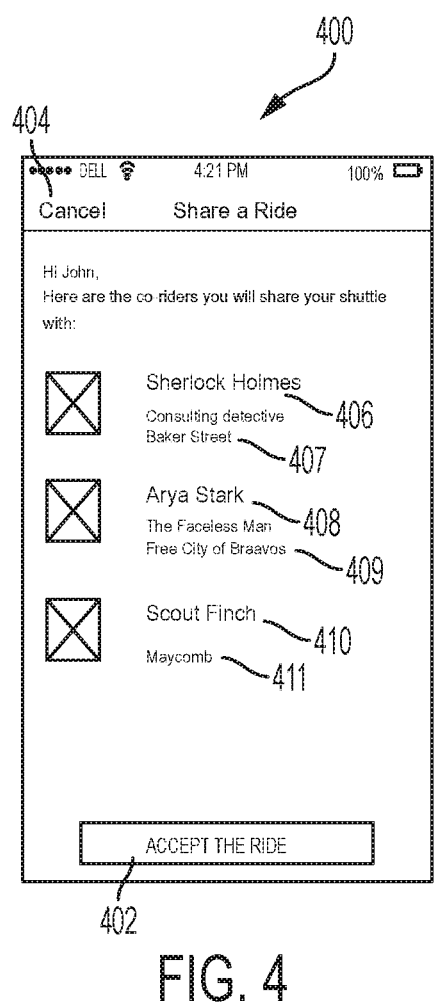
FIG. 4 depicts an exemplary message displayed to a member of a ride-sharing group before the ride, according to an embodiment of the disclosure.

Referring to FIG. 4, one exemplary snapshot 400 is shown for providing feedback by the member. The snapshot also depicts various members 406, 408, 410 of the ride-sharing group. The feedback may be provided by the member by accepting the ride indicated as 402 or by cancelling the ride button 404. Also, respective details 407, 409, 411 of the members 406, 408 and 410 are shown. Similarly, the feedback may be provided using 502 and 504 in the snapshot 500. Details 507, 509, 511 of the members 506, 508, 510 are also shown.

When the feedback from each member is in the form of acceptance, the feedback collection module 208 contacts the resource allocator 210. The resource allocator 210 allocates resources to the ride-sharing group such as a vehicle, driver, or a combination of these. After completion of the ride, the feedback collection module 208 again collects feedback from each group member to share their ride experience. In the context of the disclosure, the feedback collection module 208 gathers the feedback on the ride instead of feedback on every co-rider from each rider.

Figure 6:
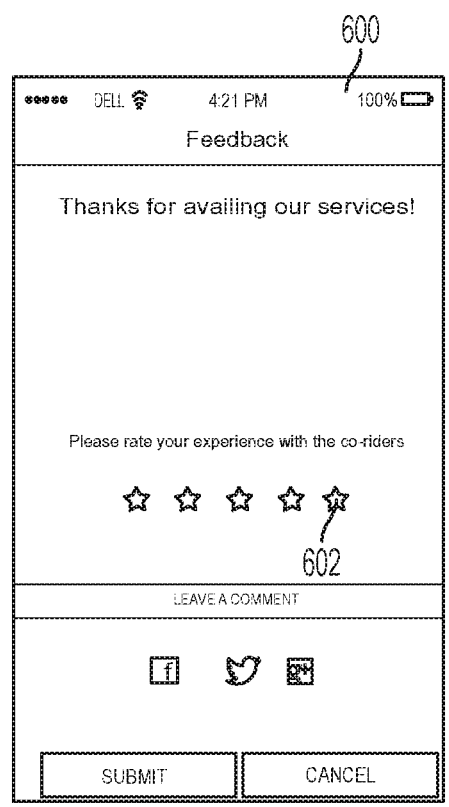
FIG. 6 depicts an exemplary message displayed to a member of a ride-sharing group after completion of the ride, according to an embodiment.

On completion of a ride, each member is solicited a ride-sharing experience feedback as shown in FIG. 6. The feedback may be provided in terms of rating as indicated by 602 in the snapshot 600. The ride-sharing experience feedback may be used to update the compatibility score of each member.

For a person skilled in the art, it is understood that the formation of a single ride-sharing group is discussed for easy discussion. In a similar manner, the group formation module 206/group compatibility module 216 forms multiple ride-sharing groups for the same route or for different routes.

The storage module 212 stores program instructions as well as other data, for example, ride-sharing data/application. For example, the storage module 212 stores all details related to requests from users such as route details, profile details, preferences details, feedback details, or any similar details required for managing ride-sharing services. The storage module 212 may include a combination of conventional memory circuits, including, electrical, magnetic, or optical memory systems. For example, memory may include read only memories, random access memories, and bulk storage. The details can be stored in any desired format. The storage module 212 of the ride-sharing system as shown in FIG. 2, is usually configured to store a ride-share application comprising of a plurality of executable instructions.

In some embodiments, the ride-sharing system 200 may have one or more additional modules for performing the required functionality for compatible group formation. While in other embodiments, the modules of the ride-sharing system 200 may be integrated to perform the required functionality. Although not shown, the ride-sharing system 200 may include a communication interface and a processor. The processor processes the required data and output as required. The communication interface operatively couples the ride-sharing system 200 to the computing devices 102 (see FIG. 1).

The ride-sharing system 200 implements a user interface enabling users to provide input in the form of source information, destination information, departure time, arrival time, profile information, preferences of the users, traits of the users or the like. Moreover, the user interface also allows the users to provide their feedback on the ride-sharing group which they are a part of or the overall ride-sharing experience. The back-end interface of the tool executes the instructions corresponding to each action performed by the user through the user interface.

In some embodiments, the ride-sharing system 200 may be pre-integrated with the service provider system, while in other embodiments, the ride-sharing system may interact with the service provider to facilitate end-to-end ride-sharing services to users.

Exemplary Flowchart

Figure 3:
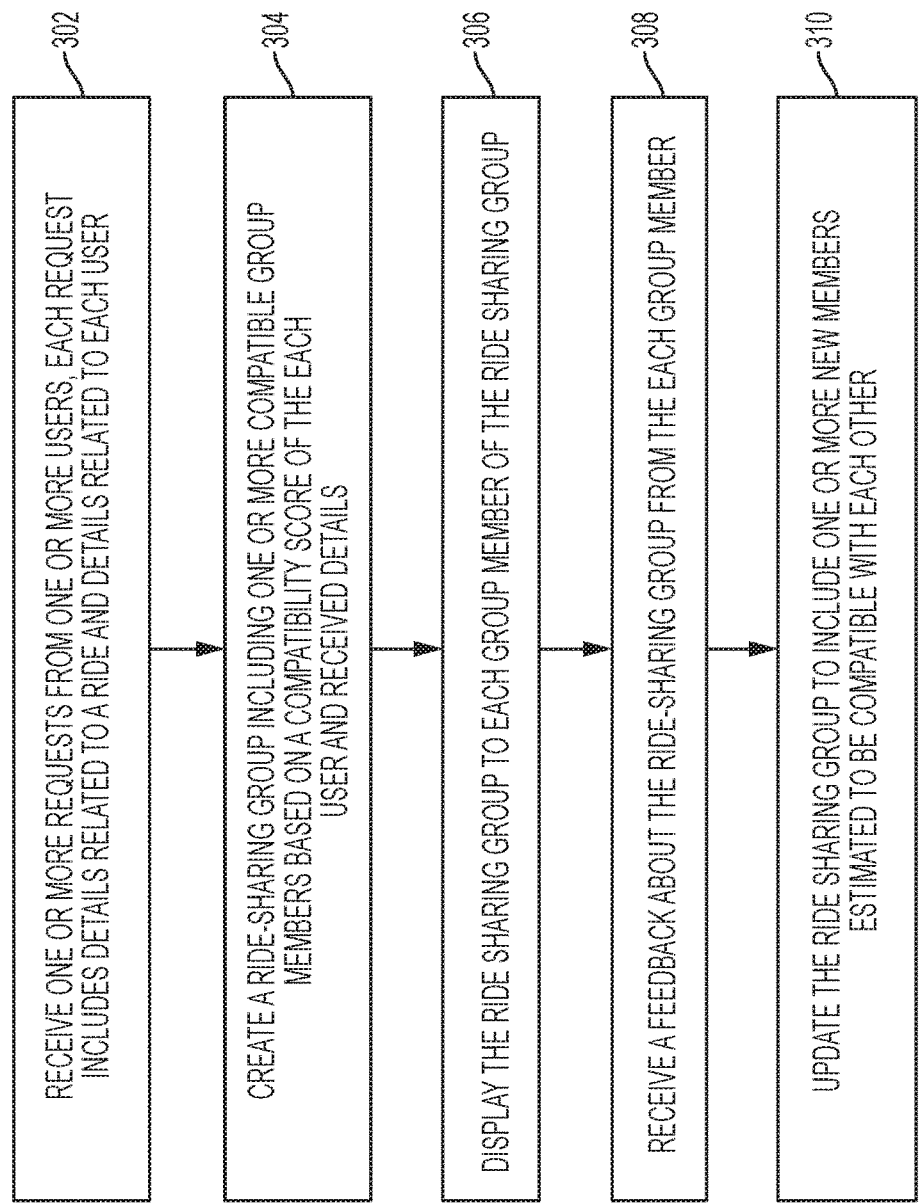
FIG. 3 is a method flowchart for automatically creating and suggesting one or more compatible ride-sharing groups.

FIG. 3 is a method flowchart for creating and suggesting one or more compatible ride-sharing groups to one or more users of a ride-sharing system. The method introduces two level of feedback from the users of the ride-sharing system—one is taken before executing ride for the users, while the second level of feedback is taken after the ride is executed or completed. This helps understand the perspective of the users in a better fashion and accordingly forms optimal ride-sharing groups in future. The method first form groups among the users and then assign these groups to specific vehicles or drivers of the service provider fleet. The primary purpose of group formation is to maximize the pleasantness of the trip/travel/ride.

Ride-sharing system/service is used by the users who wish to travel from point A to point B for business purpose, personal purpose, or any other purpose. At 302, one or more requests are received from the one or more users of the ride-sharing system. Each request includes details related to a ride and details related to each user. The details related to the ride includes source, destination, departure time, arrival time or any other details related to the ride. Further, the details related to the users includes their preferences, social information in terms of profile or any other details relevant in the context of the users. The details can be input by the users using an interface provided by the ride-sharing system. In some embodiments, the details about the users may be taken or extracted from third party sources such as social networking websites as known in the art or later developed. Few examples of such websites include Facebook, Twitter, Instagram, or the like.

Once the details are received from the users, first level of grouping is done such that users whose travel details are same or are overlapping are clubbed together. For example, users having same source, i.e., starting point, travel time or destination point are clubbed to form a group. Such users may also be referred to as route-compatible users. Techniques to club or group the users based on their route or travel details are known in the art and thus, can be referred to.

In the context of the current disclosure, grouping is further performed to group route compatible users such that happiness is maintained within each group. At 304, a ride-sharing group is created, including one or more compatible group members based on a compatibility score of each user and received details. In other words, a second level of grouping is performed to group one or more route compatible users who are estimated to compatible with each other. This second level of grouping is done for the users who are route compatible with each other. The second level of grouping is performed based on a compatibility score for each user, the score is calculated using one or more pre-defined algorithms which will be discussed below in greater detail. Each group includes multiple members and members in each group are same. For example, each group includes 4 members. While in other embodiments, members in each group may vary. As an example, some groups may have 2 members, some may have 3 members and some may have 4 members.

The profile of the users include their preferences, source destination, historical ratings and comments. These can be processed to create real valued feature vectors (a list of real numbers). For instance, a coordinate in the feature vector can be set to 1 if a user prefers silence and 0 otherwise. The compatibility score between two users can then be the normalized inner product of their feature vectors. For instance, if one of the users prefers silence and the other user does not prefer silence, their compatibility score is low compared to the setting, where both users prefer silence, else being equal. Other methods to compute compatibility between users clustering techniques. Based on the available information, these techniques form clusters of users and score the compatibility of the users high if they belong to the same cluster and low otherwise.

Figure 5:
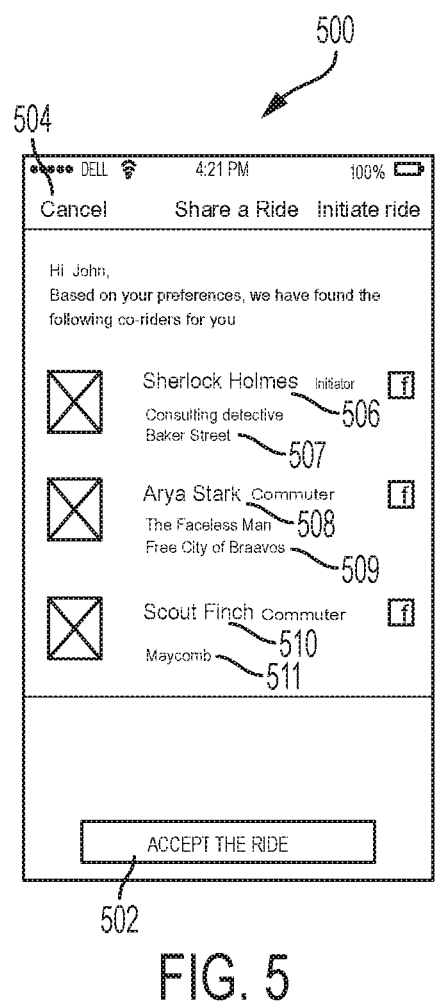
FIG. 5 depicts an exemplary message displayed to a member of a ride-sharing group before the ride, according to another embodiment of the disclosure.

Once the groups are formed, the groups are displayed to every member of each group at 306. While displaying, details about each group member is also displayed as shown in FIGS. 4 and 5. Then, a feedback about the ride-sharing group is received from each group member of the group at 308. The feedback can be received in the form of acceptance or a rejection (i.e., binary form). The acceptance indicates a member of the group is comfortable travelling with other members of the group, while the rejection indicates a member of the group is not comfortable travelling with other members of the group. In an alternate embodiment, the feedback can be in any other form that enables grouping without much modification.

In cases where the feedback is received from each member of the group is the form of acceptance then one or more resources to all such ride-sharing groups are allocated. Examples of resources include drivers and/or vehicles. In this manner, each member of all groups reach their destination and completes the ride. Upon completion of the ride, overall ride-sharing experience feedback is received from each member of the group and this is performed for all ride-sharing groups. The ride-sharing experience is to know how is the overall experience of the user while travelling or during ride-sharing instead of asking feedback for driver or co-riders as done in the art.

In cases where the feedback received from at least one member of the group is in the form of rejection, in that case a compatibility score for the member who provided feedback is re-computed. Based on the same, at 310 the ride-sharing group is updated to include one or more new members. The one or more new members are estimated to be compatible with members of the ride-sharing group (i.e., the members who provided feedback in the form of acceptance) based on the compatibility score of each of one or more new members. The step of updating the ride-sharing group is repeated until each member of the group provides the feedback in the form of acceptance. Once the feedback received from each member is in the form of acceptance, the ride-sharing group is considered as the finalized group for the travelling. As discussed above, one or more resources to all such ride-sharing groups are allocated. Examples of resources include drivers and/or vehicles. In this manner, each member of all groups reach their destination and completes the ride. Upon completion of the ride, overall ride-sharing experience feedback is received from each member of the group and this is performed for all ride-sharing groups. The ride-sharing experience is to know how is the overall experience of the user while travelling or during ride-sharing instead of asking feedback for driver or co-riders as done in the art.

Upon completion of the ride, compatibility scores for user of the ride-sharing group is computed. The updated score is used for making groups next time when the users plans to use the ride-sharing system.

In some embodiments, the method focuses on learning the compatibility between the users over time. And the learning capability increases as the users keep on taking rides or more ride-shares happen for the users.

In an embodiment, the method may be implemented by a service provider, where resources such as drivers and vehicles are provided by the service providers. In other embodiments, the method may be implemented by an individual, where the resources such as drivers and vehicle may belong to the individual.

Mathematical Explanation:

It can be considered that N number of users or participants are using the ride-sharing system as shown in FIGS. 1 and 2. Further, it can be considered that the pairwise happiness value (in other words, compatibility) between each pair of users is known or computed. The compatibility information can be represented as a undirected weighted happiness graph G=(V,E), where V represents the set of vertices, E represents the set of edges, where each edge e=(v,u) is associated with a weight We. Here, vertices represent the users and edge weights represent the pairwise happiness value or compatibility between the corresponding vertices (i.e., users) sharing the edges. Since 0 denotes zero or no compatibility, the graph G is without loss of generality a complete graph, where some edges may have 0 weight. Here the graph is considered to be undirected, because for a pair of users, the lower of the compatibility perceived by either of the pair for the other is considered to be their pairwise preference. The overall problem to be solved is to partition the users into ride-sharing groups so that the experience is pleasant for all in terms of compatibility weights. Further, group sizes are determined by the number of seats available in the ride-sharing vehicle (this is typically two or three or four). It can further be considered that all the vehicles may have the same number of seats available say k. The overall aim is to form groups of members that are likely to result in pleasant ride-share experiences for all users so as to encourage users to continue ride-sharing. In this way, fair grouping of the users is ensured.

It can further be considered the number of groups in a given solution be m=[N/k] and these groups can be denoted as G1, G2, . . . , Gm, where the groups are numbered arbitrarily. For ease of exposition, N is considered to be a multiple of k. The set of edges induced by the sub-graph Gi of the graph G is denoted as $\varepsilon i$.

Two Objectives

The happiness is defined in 2 different ways. In one definition, the average of the happiness weight achieved per group is considered. The average happiness weight Havg,i of a group of users Gi is defined as the average of the weight of the edges in the induced sub-graph of the vertices in Gi. Mathematically, it is defined as $H_{avg,i}=(\Sigma_{e \in \varepsilon i} w_e)/k$. The objective is to maximize the happiness index of the least happy group that is Maximize $\min_{i \in [m]} H_{avg,i}$. In the second definition, it can be considered a group to be as happy as the least happy user and the happiness of users in a group is considered to be the least happiness or compatibility weight achieved by the users with respect to the other users in the group. The happiness index for a group $G_i$ as $H_{min,i}$. Mathematically, it is defined as $H_{min,i}=\min_{u \in Gi} \min_{e=(v,u) \forall v \in Gi \setminus u} w_e$. In other words the above happiness index can be written more simply as: $H_{min,i}=\min_{e \in \varepsilon i} w_e$. The objective is to maximize the minimum happiness index achieved over all groups that is Maximize $\min_{i \in \{1, \ldots, m\}} H_{min,i}$.

The input to algorithms that optimize the two objectives is a weighted undirected graph G=(V, $\varepsilon$) with the weight on edge e=(v, u) denoted as $w_e$, and |V| is denoted by N. Output m groups of size k where m=m=N/k, and N is a multiple of k. If N<km, add km−N vertices to V, and add edges from these newly added vertices to each other and to all the other vertices in V of weight $w_{max}$, where $w_{max}$ is the maximum weight of any edge in the earlier graph. Let $y_{u,i}$ denote the indicator variable whether a vertex u is part of group i, and $x_{e,i}$ denote whether an edge is present in a group i, which is determined by whether both the end points of the edge are included in the group i.

Algorithm 1: Integer Programming Formulation for H {Avg}

The integer linear program for the first objective is described in the previous section: Maximize $\min_{i \in \{1, \ldots, k\}} H_{avg,i}$, where $H_{avg,i}=(\Sigma_{e \in \varepsilon i} w_e)/k$.

Maximize $H_{avg}$ such that $H_{avg} \leq H_{avg,i}$ $\forall i \in [m]$, $H_{avg,i}=\Sigma_{e \in \varepsilon} w_e x_{e,i}/k \forall i \in [m]$, $x_i \in [m] y_{u,i}=1 \forall u \in V, X u \in V y u,i=k \forall i \in [m]$, $x_{e,i} \leq \min(y_{u,i}, y_{v,i}) \forall i \in [m], \forall e=(u,v) \in \varepsilon, \forall u, v \in V$, $x_{e,i} \geq y_{u,i}+y_{v,i}-1 \forall i \in [m], \forall e=(u,v) \in \varepsilon, \forall u, v \in V$, $\Sigma i \in [m] x_{e,i} \leq 1) \forall e \in \varepsilon$, $x_{e,i} \in \{0,1\} \forall e \in \varepsilon, \forall I \in [m]$, $y_{u,i} \in \{0,1\} \forall u \in V, \forall i \in [m]$.

In the above discussion, the first two constraints define the objective, the third constraint indicates that every vertex to be part of exactly one group, the fourth one indicates that every group have exactly k participants, the fifth one denotes that an edge can be a part of a group, only if both its end points are included in the group, the sixth one indicates that if both end points of an edge are in group i, then the edge must also be in group i, the seventh one signifies that every edge can be part of at most one group, and next two are range specifiers.

Observation Regarding the H {Avg} Objective

For a given k, the structure of the optimal solution for the objective of maximizing $H_{avg}$ may be the same as maximizing any objective H, where $H=\min_{i\in[m]} H_i$, where $H_i = \Sigma e \in \epsilon i \, w_e/f(k)$ for any function of $f(k)>0$.

Algorithm 2: Integer Programming Formulation for H {Min}

This is used for computing ride-sharing groups given compatibility scores. The objective is to maximize the minimum of the compatibility scores in each ride-sharing group.

Next an integer linear programming formulation for the second objective as described earlier: Maximize $\min_{i\in\{1,\ldots,m\}} H_{min,i}$, where $H_{min,i} = \min_{e \in \subset} w_e$. In the following formulation, $w_{max}$ denotes the maximum weight on any edge in G.

Maximize $H_{min}$ such that $H_{min} \leq H_{min,i} \; \forall i \in [m]$, $H_{min,i} \leq w_e x_{e,i} + w_{max}(1-x_{e,i}) \forall I\in[m], Xi\in[m]$ $y_{u,i}=1 \forall u\in V, X\, u\in V$ $y_{u,i}=k \forall i\in[m]$, $x_{e,i} \leq \min(y_{u,i}, y_{v,i}) \forall_i \in [m], \forall e=(u,v)\in \epsilon e, \forall u,v\in V$, $x_{e,i} \leq y_{u,i}+y_{v,i}-1 \forall_i \in [m], \forall e=(u,v)\in \epsilon \forall u,v\in V$, $\Sigma i\in[m](x_{e,i} \leq 1) \forall e\in \epsilon$, $x_{e,i}\in\{0,1\} \forall e\in \epsilon, \forall i\in[m]$, $y_{u,i}\in\{0,1\} \forall u\in V, \forall i\in[m]$.

In the above program, the first constraint defines the objective as the minimum $H_{min,i}$ across all groups $i\in[m]$ and the second constraint indicates that for a particular group i, $H_{min,i}$ may be at most the weight of any edge included in the group (it is only bounded by the weight of any edge e if $x_e,i$ is 1, otherwise, the only bound is $w_{max}$). The third constraint indicates that every vertex to be part of exactly one group, the fourth one says that every group to have exactly k participants, the fifth one indicates that an edge can be a part of a group, only if both its end points are included in the group, the sixth one indicates that if both end points of an edge are in group i, then the edge must also be in group i, the seventh one indicates that every edge can be part of at most one group, and next two are range specifiers.

Algorithm 3: Greedy for Both H {Avg} and H {Min} Objectives

In addition to aforesaid integer program algorithms, a Greedy algorithm deals with forming ride-sharing groups, and can form ride sharing groups given compatibility scores of the members. These groups can be evaluated with respect to the $H_{avg}$ and $H_{min}$ objectives simultaneously. The Greedy algorithm is described that has a polynomial running time and has a comparable performance with the ILPs as shown empirically in the following section. The same algorithm is used for comparing with the ILP optimal for both objectives $H_{min}$ and $H_{avg}$. This algorithm is for the service provider version, where all the users are ride-seekers. In the following algorithm, it is considered that $|V|=N$ is a multiple of k, and it is assumed that k is a power of 2. As discussed earlier, this is achieved by adding mk−N (where m=n/k) vertices to V, and edges incident on these newly added vertices to all the original vertices of weight wmax, where $w_{max}$ is the highest weight seen in any edge in e before these vertices were added. In case $2^r<k<2^r+1$ for some integer r, we set k=2r and accordingly increase the number of vertices. In this algorithm, the well-known polynomial algorithm is used by Edmonds [4] for finding the maximum weight matching in arbitrary graphs. This is referred to as Max-Weight-Matching. The aim is to find a maximum weight matching in the given graph and assign the vertices matched to one another to the same group. After this, the edge between these vertices is collapsed and coalesce each pair of matched vertices to form super vertices. This process is repeated $\log_2 k$ times. At this point, the set of vertices in each super vertex represents a group. This is because complete graph is formed initially and at every round the number of vertices are halved, hence after $r=\log_2 k$ rounds, $N/2^r=N/k=m$ super vertices are left, which necessarily implies that each super vertex has k vertices.

Algorithm 3 Greedy: Algorithm to Find Groups (Partitions) in the Given Graph for Optimizing $H_{min}$ or $H_{avg}$ Input: Graph G=(V,E,W), group size $k=2^r$, $r\in Z^+$, and $|V|=N=mk$, $m\in Z^+$.

Output: Set of m groups: $\{G_1,\ldots,G_m\}$ where m=N/k.

Create m set of empty groups $G_1,\ldots,G_m$, where $G_i = \emptyset$ ($i\in[m]$).

$V_0 \leftarrow V$, $\epsilon_0 \leftarrow \epsilon$, and $G_0 \leftarrow G$.

for x: 1 to $\log_2 k$ do

M←Max-Weight-Matching(G')

for all e∈M do

V'←V'\{u,v|e=(u,v)}∪$v_e$, where $v_e$ is the super vertex formed by coalescing (u,v).

for all e'=(u',u)∈ε' or e'=(u',v)∈ε' do e'←ε'∪{e''=(u',$v_e$), $w_e$''=min(w(u',u),w(u',v))}\e'.

end for end for end for for all $v_e \in V'$ do $G_i \rightarrow v_e$, where the super vertex $v_e$ represents a set of k vertices at this stage end for Return $\{G_i/i\in[m]\}$.

Algorithm 4: Greedy for Both H {Avg} and H {Min} Objectives when there is No External Service Provider This is an algorithm for creating ride-sharing groups given compatibilities when one of the participants/members in each group is constrained to be a driver.

For the non-service provider version, the above algorithm needs to be modified so that there is one driver in every group. The number of drivers is considered to be m here, since the number of groups depends on the number of available drivers. Let the set of drivers be D and the set of riders be R. The number of riders is to be a multiple of k−1. As described earlier, this can be ensured by adding dummy nodes and edges to the graph, if n=|R|<m(k−1)). If n>m(k−1), some rider vertices would remain unmatched. In this case, a bipartite graph $G_0$ from G is constructed, where all the edges between the driver nodes and those between rider nodes are deleted, so that they each become an independent set, and hence the two partitions of the bipartite graph $G_0$. The algorithm proceeds by finding a maximum weight bipartite matching in this graph, using the Hungarian algorithm. This is followed by a similar vertex coalescing procedure as in Greedy, where all edges are removed between super-vertices containing driver nodes. The above process in the resultant graph is repeated, and continue this for k−1 rounds, after which the m ride sharing groups are formed. This algorithm is referred to as Matcher. The pseudocode for Matcher is given as below. In this algorithm, MaxWeight-Matching refers to the Hungarian algorithm for maximum weight bipartite matching.

Algorithm 4 Matcher: Algorithm to Match Riders with Drivers in the Given Graph for Optimizing $H_{min}$ or $H_{avg}$ Input: Graph $G=(V=D\cup R, \varepsilon, W)$, group size k, $|D|=m$, and $|R|=N\geq mk$.
Output: Set of m groups: $\{G_1, \ldots, G_m\}$.
Create m set of empty groups $G_1, \ldots, G_m$, where $G_i=\emptyset \forall i \in [m]$. $D' \leftarrow D, R' \leftarrow R, E' \leftarrow \varepsilon$, and $G' \leftarrow G$. for x: 1 to k−1 do
  Construct a bipartite graph $G'=(D\cup R, E', W)$, w where $\varepsilon'=\varepsilon\setminus\{\{e=(u,v)|(u,v)\in D\}\cup\{e'=(u',v')|(u',v')\in R\}\}$.
  $M \leftarrow$ Max-Weight-Matching (G')
  for all $e=(u,v)\in M$ do $D' \leftarrow D'\setminus\{u|e=(u,v), u\in D\}\cup v_e$, where $v_e$ is the super vertex formed by coalescing (u,v). $\varepsilon' \leftarrow \varepsilon'\setminus e$.
  for all $e'=(u,v')\in \varepsilon'$
  do $e' \leftarrow (v_e, v')$, $w_{e'}=\min(w_{e'}, w_{e''}=(v,v')\in \varepsilon\setminus)|v\in v_e$. end for
    $R' \leftarrow R'\setminus v$. $E' \leftarrow E'\setminus\{e'|e'=(u',v)\forall u'\in D\}$
  end for
end for all $v_e \in D'$ do $G_i \rightarrow v$, where the super vertex $v_e$ represents a set of $k_e$ vertices at this stage.
end for
Return $\{G_i/i\in[m]\}$.

As discussed earlier, one of the key challenges is to make the experience of sharing a ride as pleasant or happy as possible. The algorithms 1, 2, 3 and 4 discussed above maximize: (a) the worst case happiness value of each group that is formed, and (b) the worst of the average happiness value of each group. In order to do so, the disclosure implements techniques of learning these pairwise preferences of participants through pure exploration and explore exploit strategies. Also, the given set of users are divided into groups so that every group and member is better o☐ compared to any other alternative.

Algorithm 5: Learning the Edge Weights

The algorithm for exploration and learning of edge weights is as follows. The vertices are ordered randomly and sets of k contiguous vertices are picked in the ordered list, starting from the top as the groups for the particular iteration. After this group assignment, the feedback from the commuters regarding their satisfaction with the groups they were assigned to is received. The rating given by each commuter to be the weight or compatibility towards the least liked member of the current group is considered. Once these ratings are received, the weight of the edges incident is updated on a commuter that were used in the current grouping to be the maximum of the current weight estimate for the edge and the newly disclosed rating. After this, the process is repeated for (N/k)/(n/k) rounds. At the end of this process, a vector of weights corresponding to the edges is received, where these weights are lower bounds on the actual weights. Henceforth, these weights are used as estimate to one of the group formation algorithms (Algorithms 1, 2, 3 and 4). Updating the weights is a continued process however, based on feedback received from commuters on their current group assignments, if new information regarding the weights is received any time. The intuition behind the number of rounds is that, in every round, if an oracle is used to come up with completely new groupings, so that the maximum information possible in every round are formed, then the number of rounds required for getting the complete information would be (N/k)/(n/k). This is because the number of possible groups is (N/k), and in every round, the information regarding at most new (N/k) groups not seen earlier is received.

Random permutation is used in every round so that with a reasonable probability, information regarding all new groups in every round is identified. In other words, with a reasonable probability, the permutation chosen in each round is such that the groups chosen in the earlier rounds are not repeated. Note that weight of every edge is not required to be learnt. It is enough to have explored every group in order to estimate the effective weights of the edges. Suppose, after exploring all groups, the best weight estimate for an edge e is $w'_e$, $<w_e$, where $w_e$ is its actual weight, then without loss of generality, its weight can be considered to be $w'_e$, since the structure and objective function value of the optimal solution is not changed by that substitution. This is true since all possible groupings consisting of this edge (if we have explored all groups) are explored, and therefore, if the weight estimate of e=(u,v) is lower than the actual weight, that means there are <k−1 vertices in the entire graph such that weight of the edges incident on them and either of u or v is $\geq w_e$. In other words, it implies, that the on ordering the edges incident on either u or v in non-increasing order of their weights, the $k^{th}$ edge in this ordering has a weight $w'_e$, and the edge in $k+1^{st}$ position has a weight $<w'_e$.

The disclosure is discussed with ride-sharing as one of the application areas, however it is understood the disclosure can be implemented for any application, where formation of groups or sub-groups is required.

The disclosure provides methods and systems for automatically creating and suggesting one or more compatible groups for users of ride-sharing system. The ride-sharing groups are automatically created instead of asking the users to choose the ride-sharing partners and thus, the burden of decision making is taken away from the users. The groups are formed in order to raise user satisfaction or happiness in the ride-sharing system. The present disclosure provides a flexibility to all users of the ride-sharing group and hence lower the perceived inconvenience of ride-sharing by allowing these users a greater say in a privacy preserving manner. The personalized ride-sharing group suggestions encourage users to opt for ride-sharing. The disclosure also focuses on privacy perseveration part as the feedback is taken for the whole ride-sharing part instead of ride-sharing partners, thus gives the perception of less intrusion to the users. The feedback is taken from the users before execution the ride as well as after executing the ride, the feedback helps fine tune internal representation of inter-users compatibilities improving group formation capabilities and the general pleasantness of ride-sharing as a function of time. Additionally, the system does not query compatibility between users explicitly and thus, reduces cognitive burden associated with ratings and social burden of judging others explicitly.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating" or "monitoring" or "displaying" or "tracking" or "identifying" "or receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for forming one or more ride-sharing groups for one or more users of a ride-sharing system before executing a ride, the system being in communication with one or more user devices, comprising:
   a processor; and
   a memory communicatively coupled to the processor, wherein the memory is configured to store program code which when executed by the processor causes the system to:
      receive a request for a ride from each of the one or more users, each request includes details related to the ride and details related to each of the one or more users;
      based on the received details, compute a compatibility score for pairs of the one or more users;
      based on the computed score, automatically create a ride-sharing group including one or more members selected from the one or more users estimated to be compatible with each other;
      send for display, the ride-sharing group to each member of the ride-sharing group along with pre-defined details of each member and a link to accept or deny the ride sharing group,
         wherein the ride sharing group with pre-defined details of each member is displayed in a graphical interface on a user device associated with each member of the ride-sharing group,
         wherein the graphical interface comprises a button associated with the link to submit feedback about the ride-sharing group, and
         wherein the feedback being in the form of an acceptance or a rejection;
      receive the feedback about the ride-sharing group from each group member via the respective user device;
      based on the feedback, update the ride-sharing group to include one or more new members selected from the one or more users or route a vehicle and driver to service the ride-sharing group; and repeat the step of updating the ride-sharing group until each member of the ride-sharing group indicates the feedback in the form of an acceptance, wherein the one or more ride-sharing groups are formed based on interaction between the ride-sharing system and the user devices associated with the member of the ride-sharing group in real-time, such that members are compatible within the ride-sharing group.

2. The system of claim 1, wherein the memory is configured to store the details of each of the one or more users, the one or more ride-sharing groups, and score of each of the one or more users.

3. The system of claim 1, wherein the processor is configured to group the one or more users based on geographical and timing information.

4. The system of claim 1, wherein the processor is configured to form multiple ride-sharing groups.

5. The system of claim 1, wherein the details of each user includes at least one of: preferences and profile information.

6. The system of claim 1, wherein the processor is configured to obtain an overall ride-sharing experience feedback about the ride from each member of the ride-sharing group, after completion of the ride.

7. The system of claim 6, wherein the processor is configured to update the compatibility score of each member of the ride-sharing group, based on the ride-sharing experience feedback.

8. The system of claim 1, wherein each member of the ride-sharing group is a ride seeker.

9. The system of claim 1, wherein one member of the ride-sharing group is a ride initiator.

10. The system of claim 1, wherein the members of the ride-sharing group are route compatible with each other.

11. A ride-sharing system for automatically forming and suggesting ride-sharing groups, the ride-sharing system being in communication with one or more user devices, comprising a processor programmed to:

receive a request for a ride from each of the one or more users, each request includes details related to the ride and details related to each of the one or more users;

automatically create a ride-sharing group including one or more members from the one or more users estimated to be compatible with each other based on a compatibility score of each user;

generate and display a graphical interface on a user device of each group member of the ride-sharing group wherein the graphical interface includes pre-defined details of each member of the ride-sharing group and a button to submit feedback about the ride-sharing group, the feedback being in the form of an acceptance or a rejection;

receive the feedback about the ride-sharing group from each member of the ride-sharing group before executing the ride;

based on the feedback, update the ride-sharing group to include one or more new members selected from the one or more users or route a vehicle and driver to service the ride-sharing group;

repeat the step of updating the ride-sharing group until each member of the ride-sharing group indicates the feedback in the form of acceptance; and after the ride is completed, receive an overall feedback about the ride-sharing experience from each member of the ride-sharing group.

12. The system of claim 11, wherein the processor is programmed to update the compatibility score of each of the one or more users, based on the overall ride-sharing experience feedback and feedback before executing the ride.

13. The system of claim 11, wherein the processor is programmed to compute a compatibility score of each of the one or more users.

14. A method for forming and suggesting one or more compatible ride-sharing groups to one or more users of a ride-sharing system in a real-time, the method comprising:

receiving a request from each of the one or more users, each request includes details related to a ride and details related to each of the one or more users;

based on the received details, automatically creating a ride-sharing group including one or more members selected from the one or more users estimated to be compatible with each other, based on a compatibility score of each of the one or more users;

displaying, in a graphical interface on a user device of each member of the ride-sharing group, details of each member of the ride-sharing group and a button to submit feedback about the ride-sharing group, the feedback being in the form of an acceptance or a rejection;

based on the feedback, updating the ride-sharing group to include one or more new members from the one or more users or route a vehicle and driver to service the ride-sharing group; and repeating the above until the each member of the ride-sharing group indicates the feedback in the form of the acceptance.

15. The method of claim 14 further comprising computing a compatibility score for each of the one or more users, based on a pre-defined algorithm.

16. The method of claim 14 further comprising updating the compatibility score for each of the one or more users, based on the feedback.

17. The method of claim 14, wherein the details of each of the one or more users includes one or more preferences and a profile information.

18. The method of claim 14 further comprising grouping the one or more users based on geographical and timing information.

19. The method of claim 14 further comprising collecting a ride-sharing experience feedback about a ride from each member of the ride-sharing group, after completion of the ride.

20. The method of claim 19, further comprising updating the compatibility score of each member of the ride-sharing group, based on the ride-sharing experience feedback.

21. A method for automatically creating one or more compatible groups for a set of users of a ride-sharing system in a real-time, the set of users are route compatible users, the method comprising:

receiving information about each of the set of users;

computing a compatibility score for each of the set of users, using a predefined algorithm;

based on the computed score, automatically creating one or more ride-sharing groups, each group of the one or more ride-sharing groups including one or more compatible members, wherein the one or more compatible members belong to the set of the users;

for each of the one or more ride-sharing groups, transmitting to a user device of each of the one or more compatible members, wherein each device of the one or more compatible members generates and displays a graphical interface that presents details of the one or more compatible members and a button to submit feedback about the one or more compatible members, the feedback being in the form of an acceptance or a rejection;

for each of the one or more ride-sharing groups, receiving the feedback about the ride-sharing group from each of the one or more compatible members;

based on the feedback, performing one of the following:
- for each of the one or more ride-sharing groups, if the feedback from at least one of the one or more compatible members is in the form of rejection, updating the ride-sharing group to include one or more new compatible members, and
- for each of the one or more ride-sharing groups, if the feedback from each of the one or more compatible members is in the form of an acceptance, routing a vehicle and driver to service the ride-sharing group.

22. The method of claim 21, further comprising receiving a ride sharing experience feedback from each of the one or more compatible members of the ride-sharing group after the completion of a ride.

\* \* \* \* \*